US009813962B1

(12) United States Patent
Vivanco et al.

(10) Patent No.: US 9,813,962 B1
(45) Date of Patent: Nov. 7, 2017

(54) MOBILITY PATTERN BASED PREEMPTIVE LOAD BALANCING

(71) Applicant: Sprint Spectrum LP, Overland Park, KS (US)

(72) Inventors: Daniel Vivanco, Sterling, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 64 days.

(21) Appl. No.: 14/969,860

(22) Filed: Dec. 15, 2015

Related U.S. Application Data

(63) Continuation of application No. 14/089,891, filed on Nov. 26, 2013, now Pat. No. 9,247,447.

(51) Int. Cl.
*H04W 4/00* (2009.01)
*H04W 36/22* (2009.01)
*H04W 72/04* (2009.01)
*H04W 4/02* (2009.01)
*H04W 36/32* (2009.01)

(52) U.S. Cl.
CPC ........... *H04W 36/22* (2013.01); *H04W 4/021* (2013.01); *H04W 36/32* (2013.01); *H04W 72/048* (2013.01); *H04W 72/0453* (2013.01)

(58) Field of Classification Search
CPC combination set(s) only.
See application file for complete search history.

(56) References Cited

U.S. PATENT DOCUMENTS

| 7,047,015 | B2 | 5/2006 | Hawe | |
| 8,498,207 | B2* | 7/2013 | Trigui | H04L 41/5025 370/235 |
| 9,226,197 | B2* | 12/2015 | Cui | H04W 28/08 |
| 2010/0110890 | A1* | 5/2010 | Rainer | H04M 15/00 370/232 |
| 2010/0124933 | A1 | 5/2010 | Chowdhury et al. | |
| 2010/0214943 | A1 | 8/2010 | Immendorf et al. | |
| 2015/0111594 | A1 | 4/2015 | Cui et al. | |

* cited by examiner

*Primary Examiner* — Frank Duong

(57) ABSTRACT

Maps of high wireless device movement and high wireless device traffic are created. These maps are correlated over selected periods of time to determine when, and where, large numbers of wireless devices are both moving and creating problematic traffic. Stationary wireless devices using an access node in the problem area are identified before the selected time period (e.g., 30 minutes before commuting time). These stationary wireless devices are handed over to a reserved frequency band. During the selected time period, wireless devices requesting access in the problem area are denied access using the reserved frequency band and are instead forced to use another frequency band.

15 Claims, 6 Drawing Sheets

MOBILITY PATTERN BASED PREEMPTIVE LOAD BALANCING

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Overview

In an embodiment, a first plurality of traffic volume indicators are correlated with a first plurality of mobility indicators. The first plurality of traffic volume indicators and the first plurality of mobility indicators are both associated with an access node and a reoccurring time period. Based on the correlation between the first plurality of traffic volume indicators and the first plurality of mobility indicators over the reoccurring time period, the access node is selected for load balancing. Prior to the reoccurring time period, a set of stationary wireless devices being served by the access node is determined. During the reoccurring time period, the access node is controlled to serve the set of stationary wireless devices using a first frequency band.

In an embodiment, a communication system includes an access node configured to select, for each of a plurality of wireless devices served by the access node, a one of a plurality of frequency bands to serve each of the plurality of wireless devices. The access node is configured to select a first frequency band of the plurality of frequency bands to serve a first set of wireless devices that are classified as stationary. The access node is configured to select another of the plurality of frequency bands to serve a second set of wireless devices that are classified as mobile.

In an embodiment, a wireless device mobility pattern map over a geographical area is created. The wireless device mobility pattern map is associated with a reoccurring time period. A wireless device volume pattern map is created over the geographical area. The wireless device volume pattern map is also associated with the reoccurring time period. The wireless device mobility pattern map is correlated with the wireless device volume pattern map to determine a geographical subarea that meets a requirement threshold. This requirement threshold indicates a high loading of access nodes within the geographical subarea during the reoccurring time period is a result of mobile wireless devices. At least one access node within the geographical subarea is configured to direct wireless devices seeking access via the at least one access node to not use a selected frequency band to communicate with the at least one access node.

DETAILED DESCRIPTION

In an embodiment, a given geographic area (e.g., market, city, tracking area) is divided into a map grid of subareas (e.g., 1 mile on a side squares). For each grid square, traffic volume and mobility are measured over a selected time interval (e.g., morning commute—7 to 9 a.m.) Adjacent grid squares of high mobility indicate a large number of wireless devices traveling the same route (e.g., an interstate highway). Grid squares with high volume indicate potential loading problems. Correlating the mobility map grid squares with the corresponding volume map grid squares indicate areas where problems are likely to be caused by wireless devices that are moving during the selected time period.

To reduce problems caused by these moving wireless devices, stationary wireless devices using an access node in the problem area are identified before the selected time period (e.g., 30 minutes before commuting time). These stationary wireless devices are handed over to a reserved frequency band. Then, during the selected time period, wireless devices requesting access in the problem area are denied access to the reserved frequency band and are instead forced to use another frequency band. Forcing the moving wireless devices to use a different frequency band than the stationary wireless devices are using helps to reduce the impact that the moving wireless devices have on the user experience of the stationary wireless devices.

Figure 1:
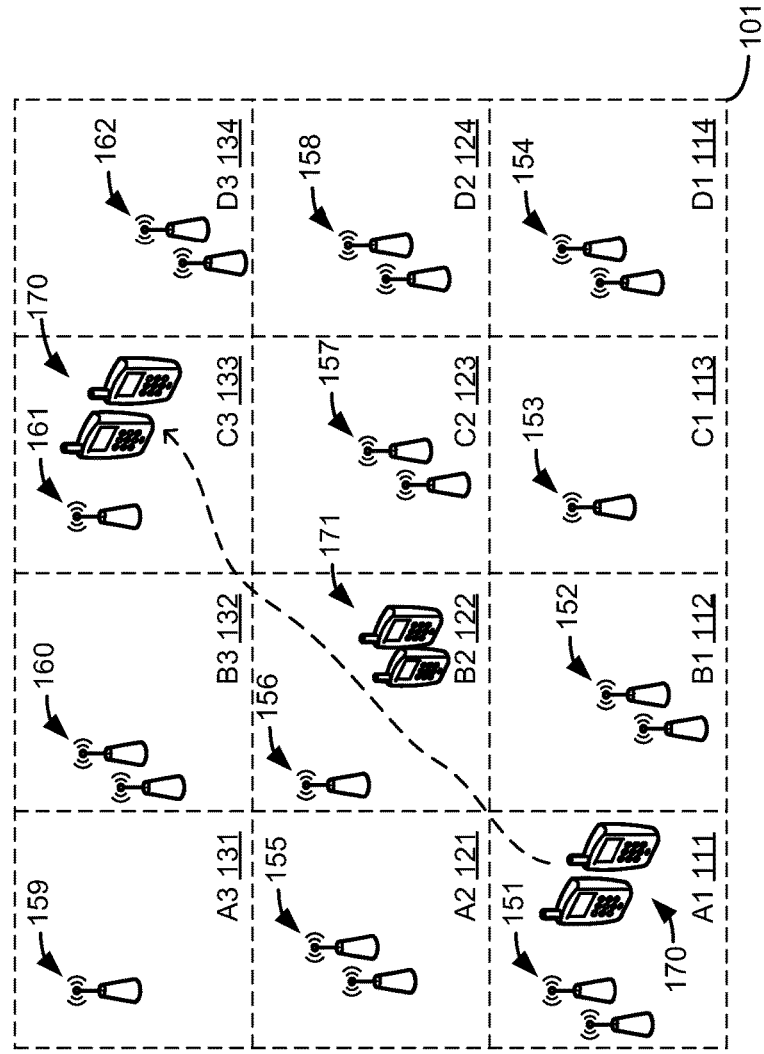
FIG. 1 is a diagram of a geographical area of a communication system.

FIG. 1 is a diagram of a geographical area of a communication system. In FIG. 1, communication system 100 comprises access nodes 151-162, moving wireless devices 170, and stationary wireless devices 171. Communication system 100 is spread across geographical area 101. Geographical area 101 is further divided into geographical subareas (a.k.a. grid squares) 111-134.

In FIG. 1, access nodes 151 are located within grid square A1 111. Access nodes 152 are located within grid square B1 112. Access nodes 153 are located within grid square 31 113. Access nodes 154 are located within grid square D1 114. Access nodes 155 are located within grid square A2 121. Access nodes 156 are located within grid square B2 122. Access nodes 157 are located within grid square C2 123.

Access nodes 158 are located within grid square D2 123.
Access nodes 159 are located within grid square A3 131.
Access nodes 160 are located within grid square B3 132.
Access nodes 161 are located within grid square C3 133.
Access nodes 162 are located within grid square D3 134.

Also in FIG. 1, moving wireless devices 170 are depicted by an arrow as moving from grid square A1 111 through grid square B2 122 to grid square C3 133. Stationary wireless devices 171 are located within grid square B2 122. Examples of moving wireless devices 170 and stationary wireless devices 171 can include a cell phone, a smart phone, a computing platform such as a laptop, palmtop, or tablet, a personal digital assistant, or an internet access device, including combinations thereof.

Other network elements may be present in communication system 100 to facilitate wireless communication to/from moving wireless devices 170 and stationary wireless devices 171 but are omitted for clarity, such as base stations, base station controllers, gateways, mobile switching centers, dispatch application processors, and location registers such as a home location register or visitor location register. Furthermore, other network elements may be present to facilitate communication between access nodes 151-162 which are omitted for clarity, including additional processing nodes, routers, gateways, and physical and/or wireless data links for carrying data among the various network elements.

Moving wireless devices 170 and stationary wireless devices 171 may be any devices, systems, combination of devices, or other such communication platforms capable of communicating wirelessly with one or more of access nodes 151-162. One or more of moving wireless devices 170 and stationary wireless devices 171 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via one or more of access node 151-162. Other types of communication platforms are possible.

Moving wireless devices 170 and stationary wireless devices 171 may establish communication sessions with one or more of access nodes 151-162 in order to receive communication service. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Access nodes 151-162 are network nodes capable of providing wireless communication to moving wireless devices 170 and stationary wireless devices 171. Access nodes 151-162 each can be, for example, a base transceiver station, a radio access node, an eNodeB device, or an enhanced eNodeB device.

In an embodiment, moving wireless devices 170 represent a large number of wireless devices that can be engaged in high data rate applications (e.g., video) while moving around communication system 100 (and geographical area 101, in particular). Moving wireless devices 170 can consume a large amount of air-interface resources (a.k.a., physical resource blocks—PRBs). Stationary wireless device 171 may experience a degradation in the quality of their user experience as a result of moving wireless devices 170 traversing communication system 100. In particular, moving wireless devices 170 may use a large amount of air-interface resources compared to stationary wireless devices 171. Moving wireless devices 170 can induce intermittent increases and decreases in activity or frequency of traffic (i.e., burstiness). As moving wireless devices 170 change position within a cell of communication system 100, or are handed between cells in communication system 100, wireless devices 170 and/or access nodes 151-162 may change modulation and coding schemes. This results in large variances in the amount of air-interface resources being used to communicate with moving wireless devices 170. These variances can impact stationary wireless devices 171 that are running real-time applications. These impacts can include stationary wireless devices 171 outputting jittery audio and/or video.

In an embodiment, the movement pattern(s) of moving wireless devices 170 are estimated using statistical methods. For example, for each of grid squares 111-134 traffic volume indicators and mobility indicators can be measured. Volume indicators can include air-interface resources or bytes of data. Mobility indicators can include the number of handoffs and/or cell redirections. For each grid square 111-134, the volume indicator for that grid square 111-134 can be based on the average of the volume of the access nodes inside the respective grid square during a selected reoccurring time period. For each grid square 111-134, the mobility indicator for that grid square 111-134 can be based on the average of the number of handoffs and/or cell redirections performed by the access nodes inside the respective grid square 111-134 during the selected reoccurring time period. These volume and mobility indicators can be correlated can be correlated to find similarities and patterns. To illustrate, consider FIG. 2.

Figure 2:
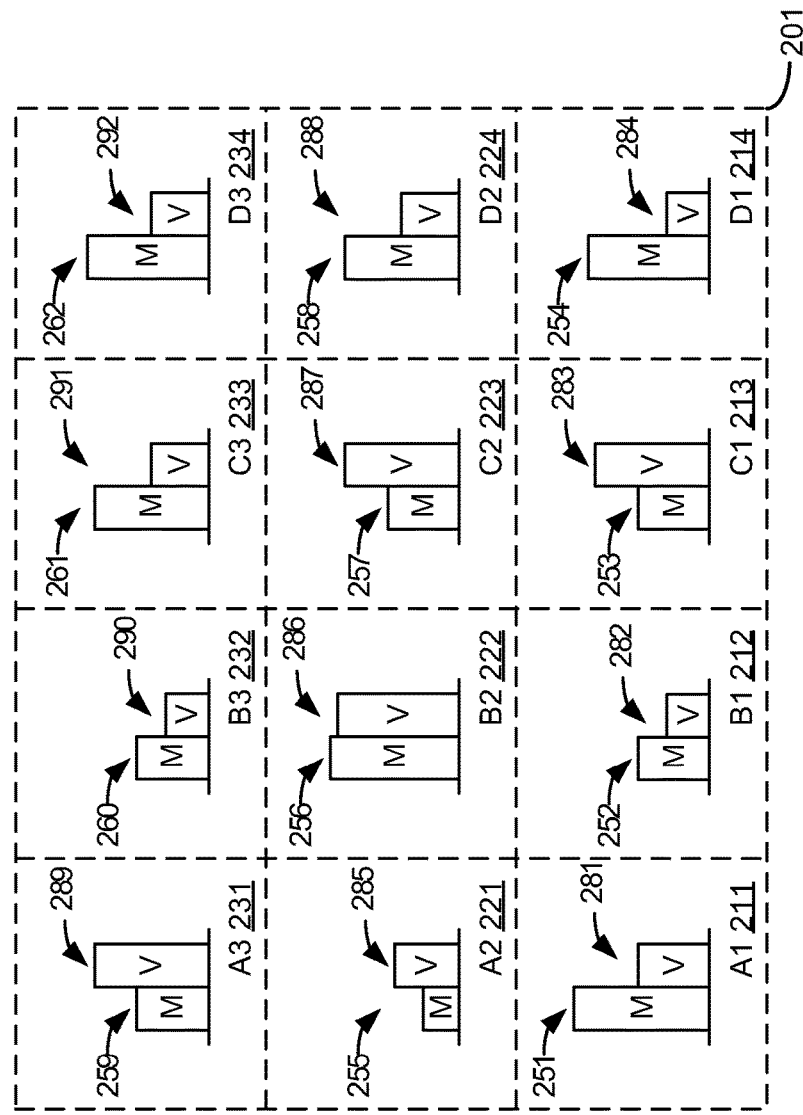
FIG. 2 illustrates a geographical map of traffic volume and mobility indicators.

FIG. 2 illustrates a geographical map of traffic volume and mobility indicators for a selected reoccurring time period (e.g., an expected commuting time). In FIG. 2, geographical area 201 corresponds to geographical area 101 in FIG. 1. Geographical area 201 is further divided into geographical subareas (a.k.a. grid squares) 211-234 that correspond to the geographical subareas 111-134 of FIG. 1.

In FIG. 2, mobility indicator 251 and volume indicator 281 are shown within grid square A1 211. Mobility indicator 251 shows relatively high mobility. Volume indicator 281 shows relatively moderate volume. Mobility indicator 252 and volume indicator 282 are shown within grid square B1 212. Mobility indicator 252 shows relatively moderate mobility. Volume indicator 282 shows relatively low volume. Mobility indicator 253 and volume indicator 283 are shown within grid square C1 213. Mobility indicator 253 shows relatively moderate mobility. Volume indicator 283 shows relatively high volume. Mobility indicator 254 and volume indicator 284 are shown within grid square D1 214. Mobility indicator 254 shows relatively high mobility. Volume indicator 284 shows relatively low volume.

Mobility indicator 255 and volume indicator 285 are shown within grid square A2 221. Mobility indicator 255 shows relatively low mobility. Volume indicator 285 shows relatively moderate volume. Mobility indicator 256 and volume indicator 286 are shown within grid square B2 222. Mobility indicator 256 shows relatively high mobility. Volume indicator 286 shows relatively high volume. Mobility indicator 257 and volume indicator 287 are shown within grid square C2 223. Mobility indicator 257 shows relatively moderate mobility. Volume indicator 287 shows relatively high volume. Mobility indicator 258 and volume indicator 288 are shown within grid square D2 223. Mobility indicator 258 shows relatively high mobility. Volume indicator 288 shows relatively low volume.

Mobility indicator 259 and volume indicator 289 are shown within grid square A3 231. Mobility indicator 259 shows relatively moderate mobility. Volume indicator 289 shows relatively high volume. Mobility indicator 260 and volume indicator 290 are shown within grid square B3 232. Mobility indicator 260 shows relatively moderate mobility. Volume indicator 290 shows relatively low volume. Mobility indicator 261 and volume indicator 291 are shown within grid square C3 233. Mobility indicator 261 shows relatively high mobility. Volume indicator 291 shows relatively low volume. Mobility indicator 262 and volume indicator 292 are shown within grid square D3 234. Mobility indicator 262 shows relatively high mobility. Volume indicator 292 shows relatively low volume.

Thus, the movement of moving wireless devices 170 from grid square A1 111 through grid square B2 122 to grid square C3 133 can be ascertained from FIG. 2 by the relatively high mobility indicators in grid square A1 211, grid square B2 222, and grid square C3 233. Further, because grid square B2 222 is shown with a relatively high mobility indicator 256 and a relatively high volume indicator 286 (i.e., they are correlated), it can be ascertained that grid square B2 222 is likely to experience problems caused by the movement of moving wireless devices 170.

Based on the correlation of the relatively high mobility indicator 256 and the relatively high volume indicator 286 associated with grid square B2 122 (which is associated with access node 156) during the selected reoccurring time period, one or more elements of communication system 100 are configured to perform the following: (1) identify stationary wireless devices 171 before the selected reoccurring time period (e.g., 30 minutes before an expected commuting time); (2) handover stationary wireless devices 171 to a reserved frequency band; (3) during the selected reoccurring time period, moving wireless devices 170 are denied use of the reserved frequency band to communicate via access node 156 (which is in grid square B2 122)—instead, a second frequency band must be used by moving wireless devices to communicate via access node 156; and, (4) after the reoccurring time period, both moving wireless devices 170 and stationary wireless devices 171 are allowed use of the reserved frequency band.

Stationary wireless devices 171 can be identified based on an amount of time that has elapsed since a stationary wireless device was last handed over. For example, if a stationary wireless device 171 has not been handed over in the last 10 minutes, it may be classified as a stationary wireless device and moved to the reserved frequency in step (2), above. In an embodiment, stationary wireless devices 171 may only be moved to the reserved frequency if they are running applications that require a high quality of service (QoS)—for example playing video. In an embodiment, a resource (e.g., air-interface) usage that is due to stationary wireless devices 171 can be ascertained. If this resource usage is relatively low, communication system 100 may allow a predefined number of moving wireless devices 170 to use the reserved frequency band to communicate with access node 156 and deny us of the reserved frequency band to the rest of moving wireless devices 170.

Figure 3:
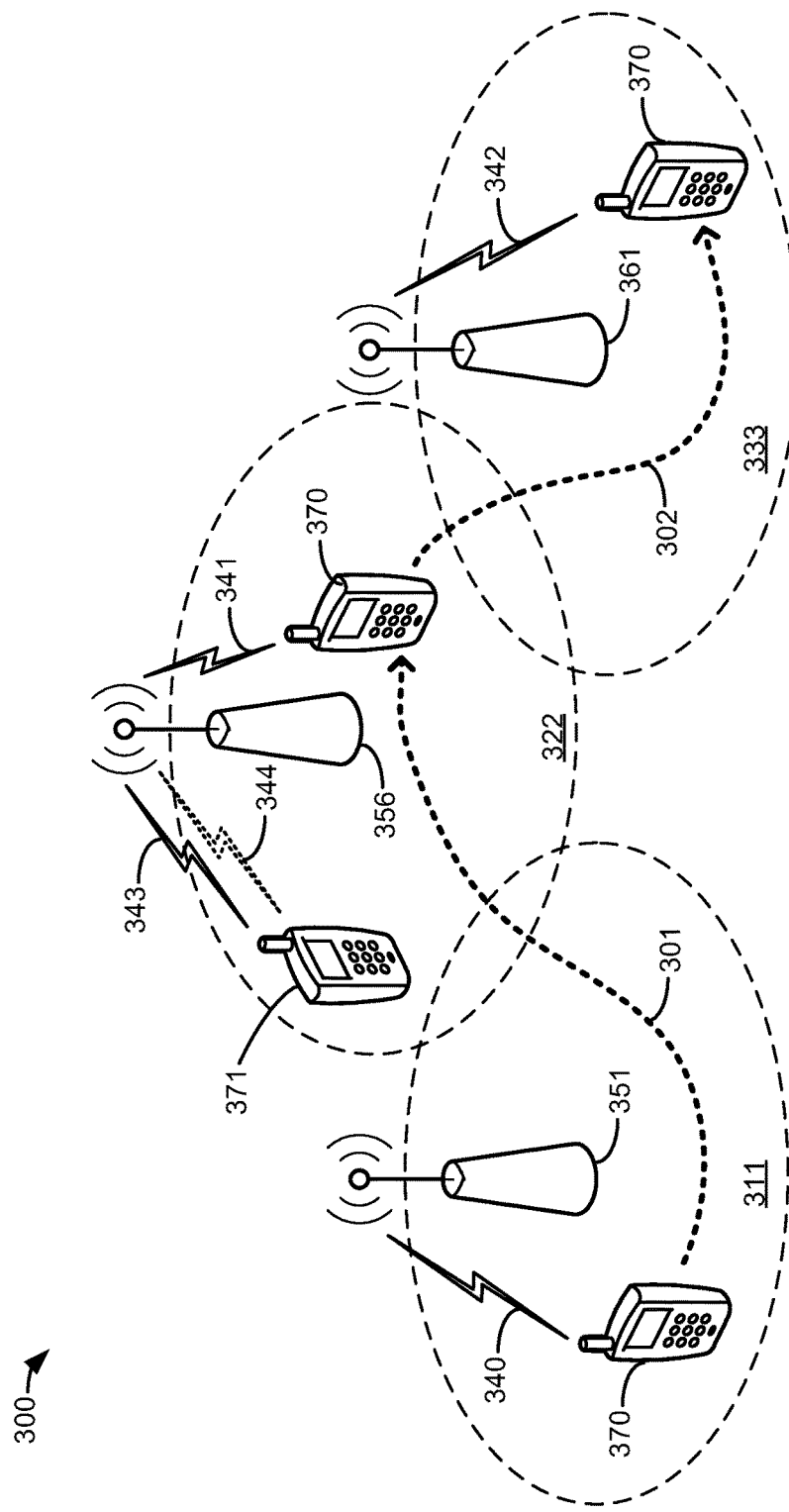
FIG. 3 is a block diagram illustrating a communication system.

FIG. 3 is a block diagram illustrating a communication system. In FIG. 3, communication system 300 comprises access node 351, access node 356, access node 361, moving wireless device 370, and stationary wireless device 371. Access node 351 is in geographical subarea 311. Access node 356 is in geographical subarea 322. Access node 361 is in geographical subarea 333. Arrow 301 illustrates moving wireless device 370's traversal from geographical subarea 311 to geographical subarea 322. Arrow 302 illustrates moving wireless device 370's traversal from geographical subarea 322 to geographical subarea 333. Stationary wireless device 371 is located in geographical subarea 322.

Moving wireless device 370 is operatively coupled to access node 351 by wireless link 340 for at least a period of time while moving wireless device is in geographical subarea 311. Moving wireless device 370 is operatively coupled to access node 356 by wireless link 341 for at least a period of time while moving wireless device is in geographical subarea 322. Moving wireless device 370 is operatively coupled to access node 361 by wireless link 342 for at least a period of time while moving wireless device is in geographical subarea 333. Stationary wireless device 371 is operatively coupled to access node 356 by wireless link 343. Stationary wireless device 371 was operatively coupled to access node 356 by wireless link 344.

Examples of moving wireless device 370 and stationary wireless device 371 can include a cell phone, a smart phone, a computing platform such as a laptop, palmtop, or tablet, a personal digital assistant, or an internet access device, including combinations thereof. Communication system 300 is a communication network that can provide wireless communication to moving wireless device 370 and stationary wireless device 371.

Communication system 300 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 300 can also comprise wireless networks, including base station, wireless communication nodes, telephony switches, internet routers, network gateways, computer systems, communication links, or some other type of communication equipment, and combinations thereof.

Wired network protocols that may be utilized by communication system 300 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 300 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between nodes in communication system 300 can be, for example, twisted pair cable, coaxial cable or fiber optic cable, or combinations thereof. Wireless links 340-344 can be a radio frequency, microwave, infrared, or other similar signal. Wireless links 340-344 can use a suitable communication protocol, for example, Worldwide Interoperability for Microwave Access (WiMAX), or Long Term Evolution (LTE), or combinations thereof. Other wireless protocols can also be used.

Other network elements may be present in communication system 300 to facilitate wireless communication to/from moving wireless device 370 and stationary wireless device 371 but are omitted for clarity, such as base stations, base station controllers, gateways, mobile switching centers, dispatch application processors, and location registers such as a home location register or visitor location register. Furthermore, other network elements may be present to facilitate communication between elements of communication system 300 which are omitted for clarity, including additional processing nodes, routers, gateways, and physical and/or wireless data links for carrying data among the various network elements.

Moving wireless device 370 and stationary wireless device 371 may be any devices, systems, combination of devices, or other such communication platforms capable of communicating wirelessly with one or more of access node 351, access node 356, and access node 361. One or more of moving wireless device 370 and stationary wireless device 371 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via one or more of access node 351, access node 356, and access node 361. Other types of communication platforms are possible.

Moving wireless device 370 and stationary wireless device 371 may establish communication sessions with one or more of access node 351, access node 356, and access node 361 in order to receive communication service. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

Access node 351, access node 356, and access node 361 are network nodes capable of providing wireless communication to moving wireless device 370 and stationary wireless device 371. Access node 351, access node 356, and access node 361 each can be, for example, a base transceiver station, a radio access node, an eNodeB device, or an enhanced eNodeB device. Access node 351 communicates information with moving wireless device 370 via wireless link 340. Access node 356 communicates information with moving wireless device 370 via wireless link 341. Access node 361 communicates information with moving wireless device 370 via wireless link 342. Access node 356 communicates information with stationary wireless device 371 via wireless link 343. Wireless link 343 uses a first frequency band. Access node 356 can communicate information with stationary wireless device 371 via wireless link 344. Wireless link 344 uses a second frequency band. Wireless link 341 also uses the second frequency band.

In an embodiment, statistical methods have been used to estimate mobility patterns of communication system 300. For example, traffic volume indicators can be correlated with volume traffic indicators over a reoccurring time period in order to identify that access node 356 will be impacted by moving wireless devices during the reoccurring time period.

During the reoccurring time period, access node 356 can be configured to select, for each of moving wireless device 370 and stationary wireless device 371 served by access node 356, one of a plurality of frequency bands to serve each of moving wireless device 370 and stationary wireless device 371. Access node 356 can be configured to classify stationary wireless device 371 a stationary. Access node 356 can be configured to classify moving wireless device 370 as mobile. Access node 356 may select a first frequency band to serve stationary wireless device 371. Access node 356 may select another of the plurality of frequency bands to serve moving wireless device 370.

Moving wireless device 370 may be classified as mobile based on access request(s) made by moving wireless device 370 to access node 356 during the reoccurring time period. Access node 356 can be configured to cause a handover of stationary wireless device 371 to the first frequency band from another frequency band prior to the reoccurring time period. Access node 356 can be configured to allow moving wireless device 370 to use the first frequency band after the reoccurring time period.

Figure 4:
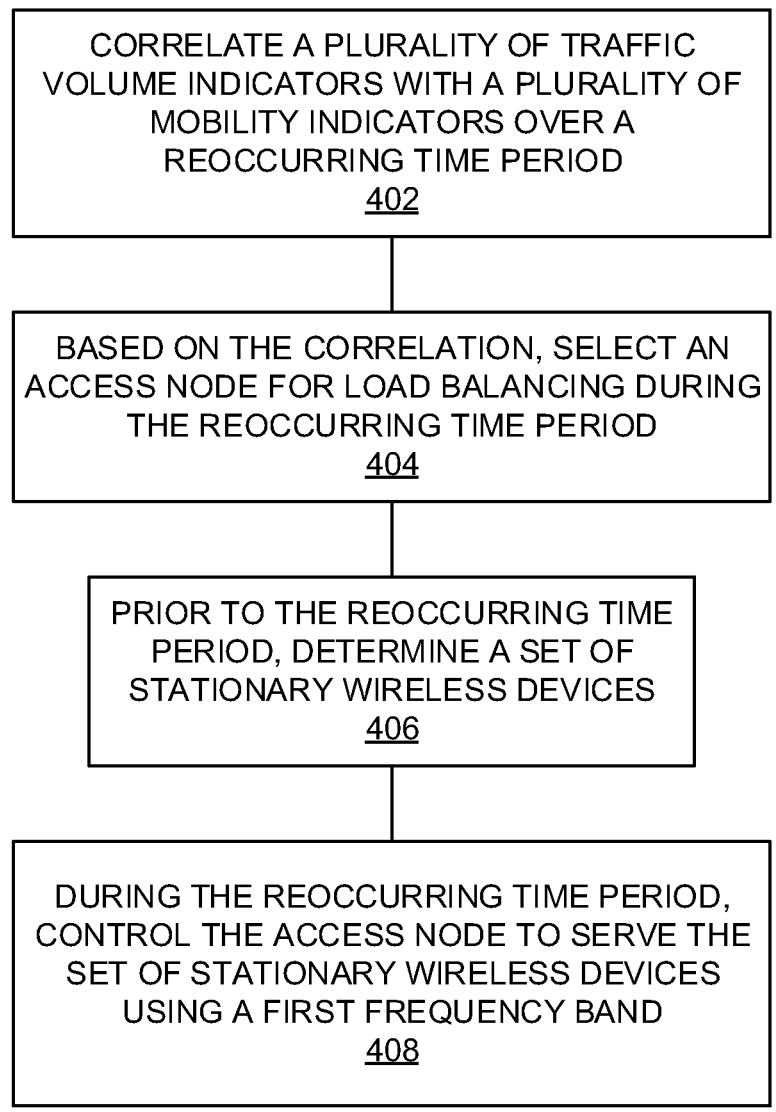
FIG. 4 is a flowchart illustrating a method of operating a communication system.

FIG. 4 is a flowchart illustrating a method of operating a communication system. The steps illustrated in FIG. 4 may be performed by one or more elements of communication system 100 and/or communication system 300. A plurality of traffic volume indicators is correlated with a plurality of mobility indicators over a reoccurring time period (402). For example, the number of bytes transferred or air-interface resources used by access node 356 can be correlated with the number of handovers and/or cell reselections by access node 356 over various time intervals (e.g., hours) of a day, week, month, etc. These correlations may show, for example, patterns of moving wireless device 370 during the reoccurring time period that correlate with heavy volume during the reoccurring time period (e.g., morning or evening commute times).

Based on the correlation, an access node is selected for load balancing during the reoccurring time period (404). For example, access node 356 may be selected for load balancing during the morning commute time due to a heavy presence of moving wireless devices 370 at the same time as a large air-interface resource utilization during the morning commute time.

Prior to the reoccurring time period, a set of stationary wireless devices are determined (406). For example, prior to the morning commute time, access node 356 may be configured to determine that stationary wireless device 371 is stationary. Stationary wireless device 371 may be determined to be stationary based on when stationary wireless device 371 was last handed off or performed a cell reselection.

During the reoccurring time period, the access node is controlled to serve the set of stationary wireless devices using a first frequency band (408). For example, during the morning commute time, access node 356 may be configured to serve stationary wireless device 371 using a first frequency band.

In an embodiment, access node 356 may be further configured to, when moving wireless device 370 requests access to access node 356, serve moving wireless device 370 using a second frequency band. Access node 356 may be configured to, when moving wireless device 370 requests access to access node 356 using the first frequency band, deny moving wireless device 370's request to be served using the first frequency band. Access node 356 may be configured to, when moving wireless device 370 is handed off to access node 356, accept wireless device 370's request to be served using the second frequency band.

Figure 5:
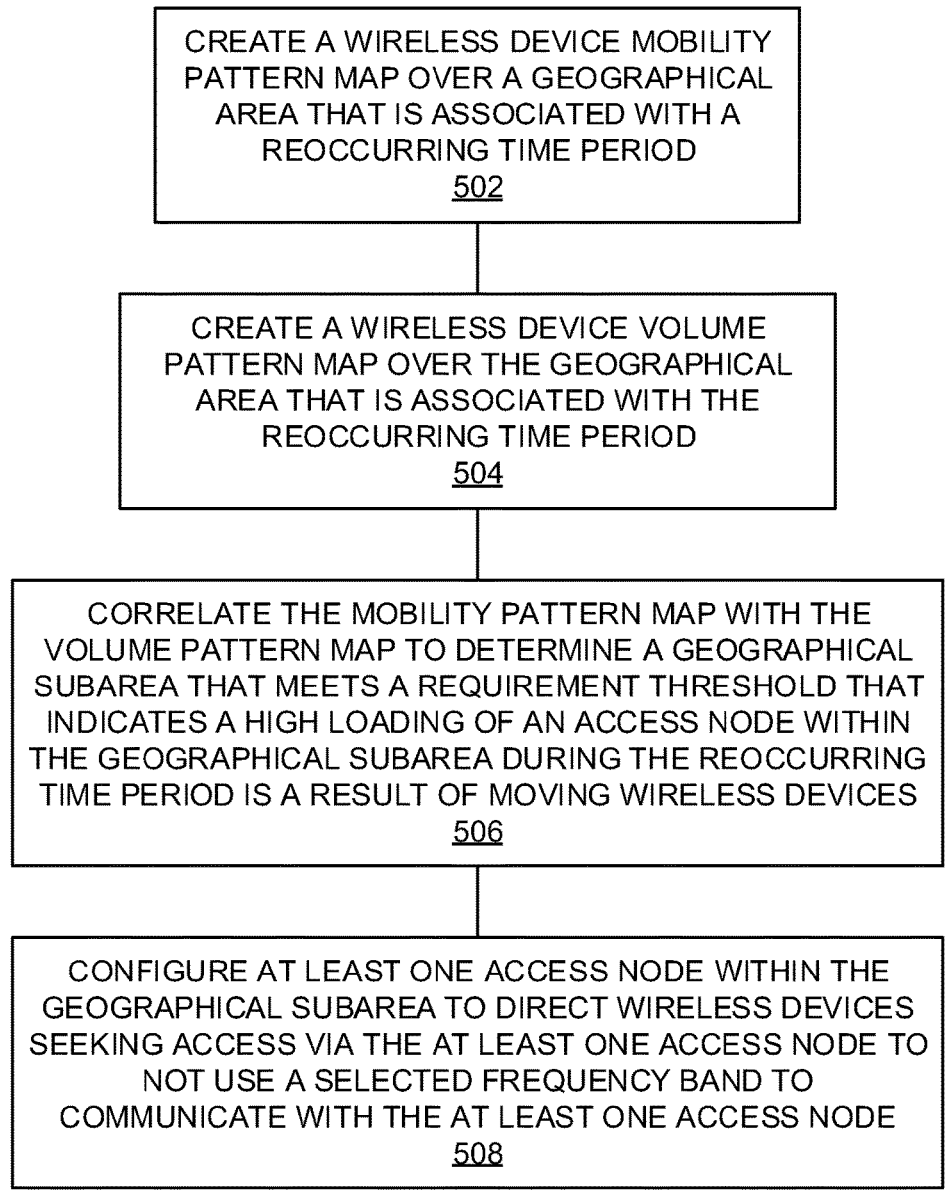
FIG. 5 is a flowchart illustrating a method of configuring a communication system.

FIG. 5 is a flowchart illustrating a method of configuring a communication system. The steps illustrated in FIG. 5 may be performed by one or more elements of communication system 100 and/or communication system 300. A wireless device mobility pattern map that is associated with a reoccurring time period is created (502). For example, a wireless device mobility pattern map may be created for geographical area 100 that is based on measurements and/or statistics taken during an expected commute time.

A wireless device volume pattern map that is associated with a reoccurring time period is created (504). For example, a wireless device volume pattern map may be created for geographical area 100 that is based on measurements and/or statistics taken during the expected commute time.

The mobility pattern map is correlated with the volume pattern map to determine a geographical subarea that meets a requirement threshold that indicates a high loading of an access node within the geographical subarea during the reoccurring time period is a result of moving wireless devices (506). For example, the grid squares of the wireless device mobility map can be correlated with grid squares of the wireless device volume map. If the correlation for a particular grid square meets a certain threshold, it can indicate a high loading of an access node within the geographical subarea during the reoccurring time period is a result of moving wireless devices. For example, if the correlation between the mobility map grid square corresponding to geographical subarea 322 and the volume map grid square corresponding to geographical subarea 322 meet a certain threshold it indicates that a high loading of access node 356 is due to moving wireless devices 370.

At least one access node within the geographical subarea is configured to direct wireless devices seeking access via the at least one access node to not use a selected frequency band to communicate with the at least one access node (508). For example, based on the correlation between the mobility map grid square corresponding to geographical subarea 322 and the volume map grid square corresponding to geographical subarea 322 meeting the threshold, access node 356 can be configured such that, during the expected commute time, access node 356 directs moving wireless devices 370 that seek access to, or are handed off to, access node 356 to not use a reserved frequency band during the expected commute time.

In an embodiment, the selected the access node can be further configured to direct wireless devices already being served by the access node to use the selected frequency band during the reoccurring time period. For example, access node 356 can be configured to direct stationary wireless devices 371 to use the reserved frequency band during the expected commute time. When the reoccurring time period is over, the access node can be configured to allow wireless devices seeking access via the access node to use the selected frequency band. For example, after the expected commute time has passed, access node 356 can be configured to allow moving wireless devices 370 to use the reserved frequency band.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 and/or communication system 300 may be, comprise, or include computers systems and/or processing nodes. This includes, but is not limited to: access nodes 151-162, moving wireless device 170, stationary wireless devices 171, access node 351, access node 356, access node 361, moving wireless device 370, and/or stationary wireless device 371.

Figure 6:
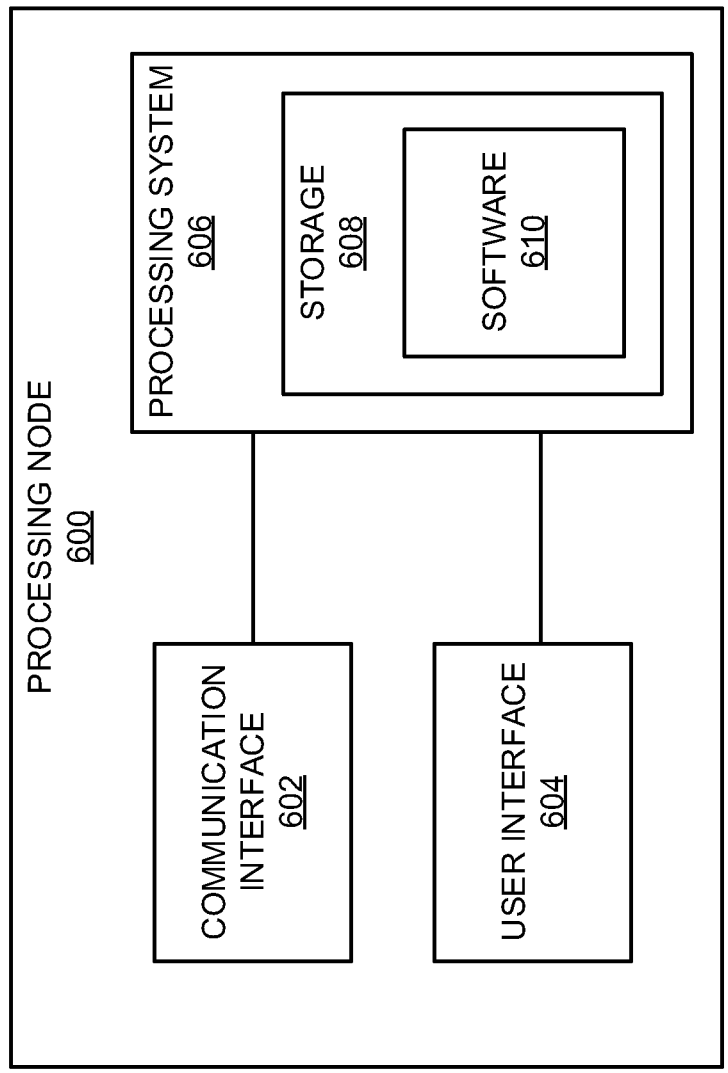
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An example of processing node 600 includes access node 356. Processing node 600 can also be an adjunct or component of a network element, such as an element of access nodes 151-162, access node 351, access node 356, access node 361, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system, comprising:
an access node configured to select, for each of a plurality of wireless devices served by the access node, a respective one of a plurality of frequency bands to serve each of the plurality of wireless devices, the access node selecting a first frequency band of the plurality of frequency bands to serve a first set of wireless devices that are classified as stationary and selecting another of the plurality of frequency bands to serve a second set of wireless devices that are classified as mobile, wherein the second set of wireless devices are classified as mobile based on access requests by respective wireless devices in the second set during a reoccurring time period.

2. The communication system of claim 1, wherein the access node is configured to, prior to the reoccurring time period, handover to the first frequency band, from another of the plurality of frequency bands, wireless devices in the first set that are not being served using the first frequency band.

3. The communication system of claim 1, wherein the reoccurring time period is selected based on a correlation between a first plurality of traffic volume indicators associated with the access node and a first plurality of mobility indicators associated with the access node over the reoccurring time period.

4. The communication system of claim 3, wherein the first plurality of traffic volume indicators are based on amounts of data transferred by the access node and the first plurality of mobility indicators are based on handoffs between neighboring access nodes and the access node.

5. A method of operating a communication system, comprising:
creating a wireless device mobility pattern map over a geographical area, the wireless device mobility pattern map associated with a reoccurring time period;
creating a wireless device volume pattern map over the geographical area, the wireless device volume pattern map associated with the reoccurring time period;
correlating the wireless device mobility pattern map with the wireless device volume pattern map to determine a geographical subarea that meets a requirement threshold that indicates a high loading of access nodes within the geographical subarea during the reoccurring time period is a result of mobile wireless devices; and,
configuring at least one access node within the geographical subarea to direct wireless devices seeking access via the at least one access node to not use a selected frequency band to communicate with the at least one access node.

6. The method of claim 5, wherein the wireless device mobility pattern map over the geographical area is based on handovers between access nodes within geographical subareas of the geographical area.

7. The method of claim 6, wherein the wireless device volume pattern map over the geographical area is based on air-interface resource usage by access nodes within geographical subareas of the geographical area.

8. The method of claim 6, wherein the wireless device volume pattern map over the geographical area is based on amounts of data transferred by access nodes within geographical subareas of the geographical area.

9. The method of claim 5, further comprising:
configuring the at least one access node within the geographical subarea to direct wireless devices, prior to the reoccurring time period, to use the selected frequency band to communicate with the at least one access node.

10. The method of claim 9, further comprising:
configuring the at least one access node within the geographical subarea to allow wireless devices seeking access via the at least one access node to use the selected frequency band to communicate with the at least one access node after the reoccurring time period.

11. A method of operating a communication system, the method comprising:
estimating a movement pattern of a plurality of mobile wireless devices using traffic volume indicators and mobility indicators associated with a geographical area;
identifying a plurality of stationary wireless devices located in the geographical area, the stationary wireless devices being served by an access node before a selected reoccurring time period;
performing handover of the stationary wireless devices to a reserved frequency band before the selected reoccurring time period;
instructing the access node to serve mobile wireless devices requesting access to the reserved frequency band to use a frequency band other than the reserved frequency band, the mobile wireless devices being denied access to the reserved frequency band during the selected reoccurring time period; and
after the reoccurring time period expires, permitting the mobile wireless devices access to the reserved frequency band.

12. The method of claim 11, further comprising:
during the selected reoccurring time period, accepting request by the stationary wireless devices to be handed off to the access node to be serviced using a frequency band other than the reserved frequency band.

13. The method of claim 11, wherein the selected reoccurring time period is based on a correlation of the traffic volume indicators and mobility indicators associated with the geographical area.

14. The method of claim 13, wherein the mobility indicators are based on handoffs between neighboring access nodes and the access node.

15. The method of claim 13, wherein the traffic volume indicators are based on air-interface resources used by the access node.

* * * * *